(12) United States Patent
Schrade

(10) Patent No.: US 8,131,603 B1
(45) Date of Patent: Mar. 6, 2012

(54) DETERMINING, STORING, AND ANALYZING PRODUCT COUNTRY CLASSIFICATIONS

(75) Inventor: Hermann Schrade, Hildrizhausen (DE)

(73) Assignee: Hewlett-Packard Development Company, L.P., Houston, TX (US)

(*) Notice: Subject to any disclaimer, the term of this patent is extended or adjusted under 35 U.S.C. 154(b) by 2195 days.

(21) Appl. No.: 10/964,527

(22) Filed: Oct. 12, 2004

(51) Int. Cl.
G06Q 10/00 (2006.01)
G06Q 20/00 (2006.01)
G06Q 30/00 (2006.01)

(52) U.S. Cl. .............................. 705/28; 705/22; 705/26

(58) Field of Classification Search .................. None
See application file for complete search history.

(56) References Cited

FOREIGN PATENT DOCUMENTS

| | | | |
|---|---|---|---|
| WO | WO0127720 | * | 4/2001 |
| WO | WO0235382 A1 | * | 5/2002 |

* cited by examiner

*Primary Examiner* — Fahd Obeid

(57) ABSTRACT

A method and system for determining, storing, and analyzing product country classifications is disclosed. In one embodiment, a classification for a part is accessed. In addition, a country information database having a list of countries for shipment of the part is accessed wherein the list of countries is based on the classification of the part. Next, country classification information is generated for the part automatically, wherein the country classification information is generated in conjunction with the classification and the list of countries designated for the part.

13 Claims, 4 Drawing Sheets

DETERMINING, STORING, AND ANALYZING PRODUCT COUNTRY CLASSIFICATIONS

TECHNICAL FIELD

The present product country classifier generally relates to importing and exporting classifications. More specifically to a software engine to determine, store, and analyze product country classifications.

BACKGROUND ART

In the international market, parts and components are regularly manufactured in one country and shipped to other countries. For example, parts and components may be manufactured in a first country and delivered to a plurality of other countries, or may be manufactured in a first country, shipped to a second country for assembly with other parts and components, and then the assembled product shipped to yet a third country. Basically, there is no limit to the number of countries that may ship or receive parts or components from an initial country.

During the international shipping of parts or components, there are a plurality of import/export rules and requirements including duty, security, monitoring, etc. on the parts or components being imported and/or exported. Countries and nations throughout the world utilize these import/export rules for a plurality of financial and political purposes. In one case, the import/export rules are used to promote fair trade. In another case, the import/export rules may be used to provide money to the nation receiving the import or providing the export.

In most cases, the import/export rules required by a specific country are based on a plurality of factors including, classification of part (what the part is or what the part does), time of year, needs of the country, etc. Therefore, the import/export rules required for a specific part or component may differ at each country and may also be adjusted annually, seasonally, quarterly, etc.

Due to the differing import/export rules and associated costs, importing and/or exporting agents and companies must maintain a group of personnel whose job entails maintaining the correct part country classification including import/export rules for each part and for every country to which the part will be imported and/or exported.

One problem with human input of the part country classification information is the amount of data to be manually input. For example, a company may have hundreds of parts with each part being imported and/or exported to a plurality of countries. Moreover, each country may have different and/or changing regulations for each part. In addition, the possibility for human error when imputing the part information or classifying the part for a plurality of countries is significant. For example, a mistype of data or forgetting to complete the import and/or export information for one of the import/export countries can result in product delays, fines, and the like. Thus, it would be desirable to have a classification reference system which can resolve the above-described difficulties.

DISCLOSURE OF THE INVENTION

Embodiments of the present invention provide a method and system for determining, storing, and analyzing product country classifications. In one embodiment, a classification for a part is accessed. In addition, a country information database having a list of countries for shipment of the part is accessed wherein the list of countries is based on the classification of the part. Next, country classification information is generated for the part automatically, wherein the country classification information is generated in conjunction with the classification and the list of countries designated for the part.

BRIEF DESCRIPTION OF THE DRAWINGS

The accompanying drawings, which are incorporated in and form a part of this application, illustrate embodiments of the present product country classifier, and together with the description, serve to explain the principles of the product country classifier. Unless noted, the drawings referred to this description should be understood as not being drawn to scale.

BEST MODE FOR CARRYING OUT THE INVENTION

Figure 1:
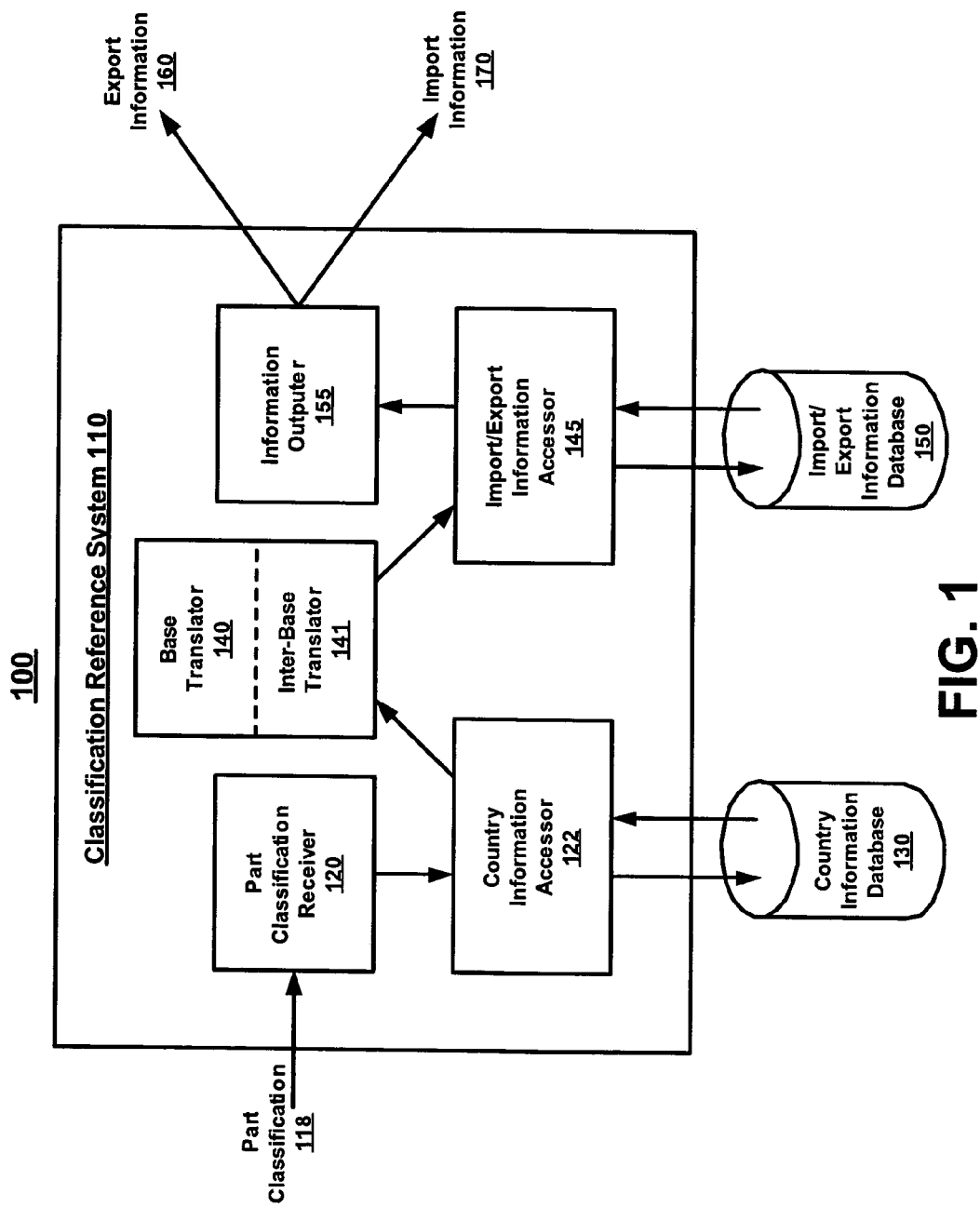
FIG. 1 is a block diagram depicting an automatic product country classification forming system in accordance with an embodiment of the present invention.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present product country classifier may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

In general, embodiments of the present product country classifier reduce the manual input requirements for import and/or export product country classifications. That is, instead of requiring manual classification for each country into which a part is imported and/or exported, an automated system is utilized to perform the country classification associated with the specific part for each import and/or export countries. In one embodiment, the country classification is performed during the initial shipping plan for all countries. In another embodiment, the country classification is performed for only the countries to which the part is being shipped. In yet another embodiment, the country classification for the part is performed for countries that have provided a request for the country classification for the part. That is, after the shipment of the part is received but prior to the release of the part from the customs official.

By automating the country classification process, the present product country classifier provides a time reduction in the manual part classification process. Additionally, the input errors of the country classification department are significantly reduced. Moreover, the automated process can be performed real-time or near real-time. That is, if a part is shipped to a country for which it was not classified, a broker will simply access the database, request a country classification for the part and receive the correct country classification near real-time. That is, without the latency normally associated with the manual country classification process (e.g., working hours, holidays, etc.). Therefore, by utilizing a real-time or near real-time automatic country classification method, a reduction in the additional fees normally present with an import and/or export classification error or omission can be realized. For example, the reduction of the additional fees may include: extra duty fees, storage charges, hold paperwork, customs official's time, part reception delay, and the like.

The following description will begin with a brief description of the components of an automatic product country classification forming system 100 of FIG. 1. This description will then be followed with a description of the operation of the automatic product country classification forming system 100.

With reference now to FIG. 1, a block diagram depicting an automatic product country classification forming system 100 is shown in accordance with an embodiment of the present product country classifier. Automatic product country classification forming system 100 includes a classification reference system 110. In one embodiment, classification reference system 110 is comprised of a part classification receiver 120 for receiving a part classification 118. Part classification receiver 120 is coupled with a country information accessor 122. Country information accessor 122 is coupled with a country information database 130 and further coupled with a base translator 140. Base translator 140 is coupled with an inter-base translator 141. Base translator 140 is further coupled with an import/export information accessor 145. Import/export information accessor 145 is coupled with an import/export information database 150 and further coupled with an information outputter 155 which outputs for example export information 160 and import information 170. In general, country information database 130 and import/export information database 150 may be co-located on the same database, or may be separate databases. In addition, country information database 130 and import/export information database 150 may be on the same server, or on different servers, or broken up between a plurality of servers.

In general, part classification receiver 120 receives a part classification 118. Part classification 118 is a classification of a part based on a part description assigned by the manufacturer or supplier of the part, component, or assembly. For example, if the product happens to be a ream of paper, the part classification 118 will be based on a specific serial or lot number, a size or weight, a bar code or identifying number sequence, a date of manufacture, an import and/or export restriction, or the like. In another embodiment, the part classification 118 is based on more or fewer of the descriptors stated herein.

The part classification receiver 120 receives the part classification 118 and automatically passes the part classification 118 information to the country information accessor 122. The country information accessor 122 utilizes a country information database 130 to ensure that the part classification (e.g., printer/fax/copier) is properly classified for the desired country. For example, instead of a user manually selecting the country classification, the automated country information accessor 130 selects the proper country classification information from the country information database 130.

With reference still to FIG. 1 and CRS 110, in one embodiment, country information accessor 122 also receives a request for a country or a list of countries for which the country classification of the part is needed from the part classification receiver 120. That is, the part classification receiver 120 will provide the country or list of countries that need import and/or export country classification information for the part, to the country information accessor 122. For example, in one embodiment, the part classification receiver 120 receives both the part classification 118 and the desired countries for classification for the part. The part classification receiver 120 then passes that information to the country information accessor 122 which accesses the country information database 130 to collect the requested country classification information.

In one embodiment, as stated herein, a user input received by the part classification receiver 120 is used to direct the selection of the country or countries for part classification. In another embodiment, the country information accessor 122 has a standard set of assigned countries per part based on the part classification 118. In yet another embodiment, the country information accessor 122 selects every country in the country information database 130 for the part country classification.

In one embodiment, country information database 130 is a database that is separate from the CRS 110 that is accessed via a network connection (e.g., Ethernet, Internet, or the like). In another embodiment country information database 130 is a database within the CRS 110. Moreover, as stated herein, in one embodiment country information database 130 may be on the same computing system (e.g., server) as import/export information database 150. In another embodiment, country information database 130 may be on a plurality of computing systems (e.g., servers, databases, etc.).

In one embodiment, CRS 110 includes a base translator 140 and/or an inter-base translator 141. In one embodiment, both base translator 140 and inter-base translator 141 are a single translator component that can perform both translation operations (e.g., base-to-base and inter-base described in more detail herein). In general, there is a plurality of country base classifications. A few of the plurality of country base classifications include the American base harmonized tariff schedule (HTS), the European base HTS, the Asian base HTS, and the like.

In general, base translator 140 allows a part that is already classified in one base classification (e.g., American base) to be classified in the other base classification (e.g., European base) in real-time or near real-time. For example, if a part already has an American base classification, the base translator 140 will perform a translation of the American base classification to the European base classification. Moreover, due to the ability of the base translator 140 to automatically translate between the two bases, the part is not accidentally or incorrectly manually reclassified, (e.g., becomes classified as a printer instead of a fax, etc.) during the translation process. That is, since the process is automated, there is no possibility of human error, incorrect assumption, or the like.

In one embodiment, inter-base translator 141 allows a part that is already classified in one base classification (e.g., American base) to be re-classified in one or more other countries within the same base (e.g., United States of America and Singapore) in real-time or near real-time. For example, if a part is already classified with an American base classification for the United States of America and the part is requested in Singapore, the inter-base translator 141 will perform a classification translation to an American base classification for Singapore. Moreover, due to the ability of the inter-base translator 141 to translate between two countries within the same base, the part is not accidentally or incorrectly manually reclassified, (e.g., becomes classified as a printer instead of a fax, etc.) when the inter-base translation occurs. That is, since the process is automated, there is no possibility of human error, incorrect assumption, or the like.

Referring still to FIG. 1 and to the CRS 110, in one embodiment, the import/export information accessor 145 is used to access an import/export information database 150. In one embodiment, import/export information database 150 has the import/export information for the classified part for the country or countries requested. That is, the import/export information database 150 will include country requirements such as trade statistics, duty and tax tables or calculations, necessary import/export licenses, hazardous materials documentation, and the like.

After the countries of import/export are selected and the base translator 140 and/or inter-base translator 141 have provided the country classification translation for the part, the import/export information accessor 145 accesses the import/export information database 150. In general, the import/export information accessor 145 retrieves the necessary information to allow the part to clear customs in the export stage, the import stage, or both the import and the export stage. In one embodiment, import/export information database 150 is a database that is separate from the CRS 110 that is accessed via a network connection (e.g., Ethernet, Internet, or the like). In another embodiment import/export information database 150 is a database within the CRS 110. Moreover, as stated herein, in one embodiment import/export information database 150 may be on the same computing system (e.g., server) as country information database 130. In another embodiment, the import/export information database 150 may be on a plurality of computing systems (e.g., servers, databases, etc.).

The export information/documentation 160 and import information/documentation 170 is then generated by the information outputter 155. After generation, the export information/documentation 160 and import information/documentation 170 is stored and made available to the shipping and/or receiving department, the customs agency, the broker, the importer, the exporter, or any other person or resource that may have a need or request for the import and/or export information.

Operation

Figure 2:
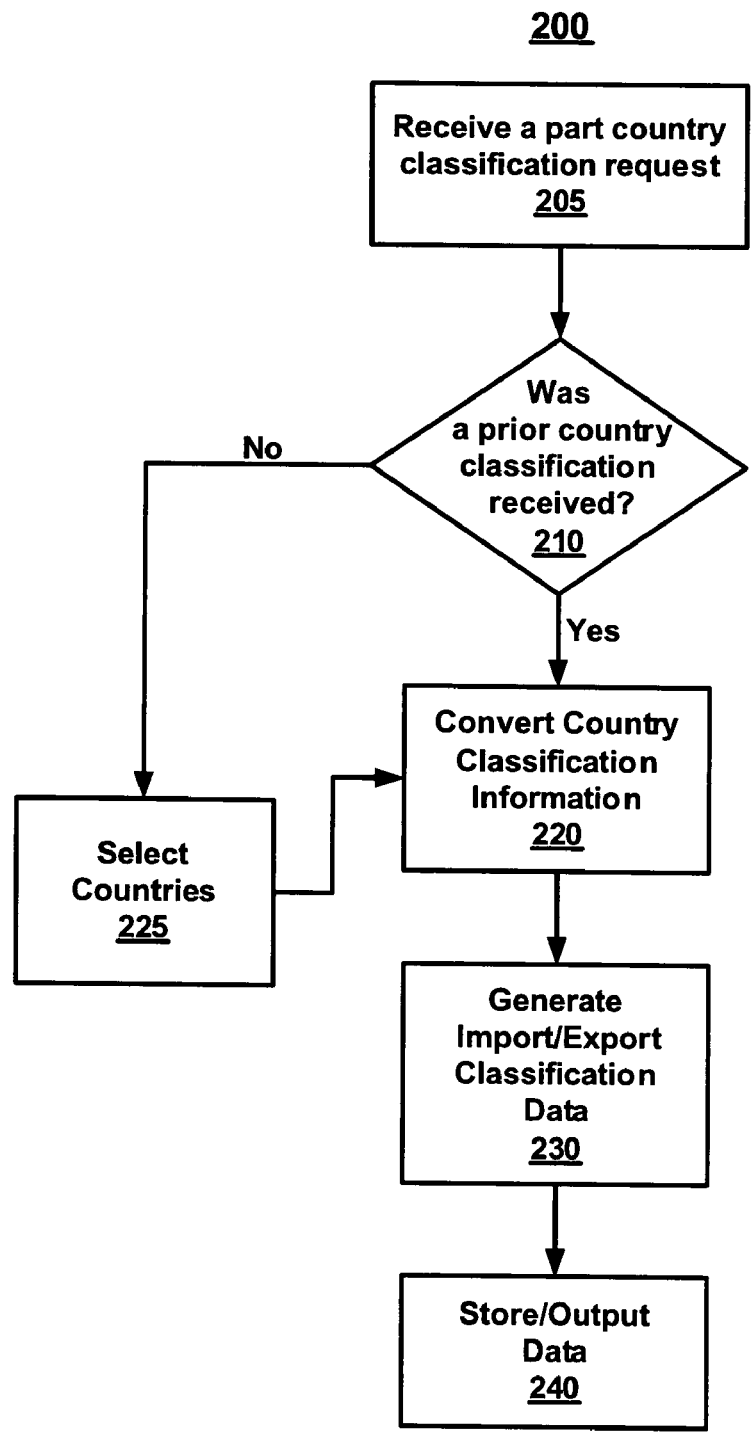
FIG. 2 is a flowchart of steps in a method for generating a product country classification in accordance with an embodiment of the present invention.

With reference now to FIG. 2, a flowchart of steps in a method for generating a product country classification is shown in accordance with an embodiment of the present product country classifier. That is, flowchart 200 shows a part needing classification for the initially desired countries of import/export.

With reference now to step 205 of FIG. 2 and also to FIG. 1, the present embodiment receives a country classification request for a part. In one embodiment, the part classification receiver 120 of FIG. 1 accesses a part classification 118 based on a title, a number, a serial number, a manufacturer, or the like. In addition, the part classification receiver 120 receives the part classification 118 via keyboard, a bar code, a scanner, a laser, blue tooth, the Internet, or any other means well known in the art for transferring data to a computing system.

Referring now to step 210 of FIG. 2 and to FIG. 1, in one embodiment, the present product country classifier queries "was country classification information received?" If prior country classification was received, then the prior country classification information for the part is provided to the base translator 140 (and/or inter-base translator 141) and the country classification information is converted at step 220. However, if prior country classification was not received (e.g., it is an initial part classification), then part classification receiver 120 will provide the part classification 118 to the country information accessor 122.

With reference now to step 225 of FIG. 2 and to FIG. 1, in one embodiment, once the part classification is received by the country information accessor 122 the country information database 130 is accessed by the country information accessor 122 to retrieve the country information for the selected countries. As described herein, in one embodiment, the selected countries are user selected by input received by the part classification receiver 120. However, in another embodiment the selected countries are a standard set of countries always selected by the country information accessor 122. In another embodiment, the selected countries are all the countries in the country information database 130, or the selected countries are based on the part classification, or a combination of the above, or the like.

Once the country information accessor 122 retrieves the country information, the country information is passed to the base translator 140 and/or inter-base translator 141 that will translate the part classification from one base HTS (e.g., American) to another base HTS (e.g., European). In another embodiment, the inter-base translator 141 converts a HTS classification for countries within the same base. For example, the inter-base translator 141 will translate a Spanish classification to an Irish classification both having the same European base.

Referring now to step 230 of FIG. 2 and to FIG. 1, in one embodiment, the import and/or export requirements for the specified countries are generated by the import/export information accessor 145 and retrieved from the import/export information database 150. The requirements include any or all of trade statistics, duty and tax calculations, import/export license(s), hazardous material documents, and the like.

With reference now to step 240 of FIG. 2 and to FIG. 1, in one embodiment, the CRS 110 stores the information retrieved from the import/export database 150. In another embodiment, the information retrieved from the import/export database 150 is passed to the information outputter 155. This information (e.g., export information 160 and/or import information 170) is then delivered to the exporter of record, importer of record, shipping department, receiving department, shipping company, country of import customs, country of export customs, broker, or any other party associated with the import and/or export of parts, components, assemblies, software, Intellectual property, or the like. In one embodiment, the information is in electronic form. In another embodiment, the information is in hardcopy form. Additionally, the information could include payment or other accounting information.

Figure 3:
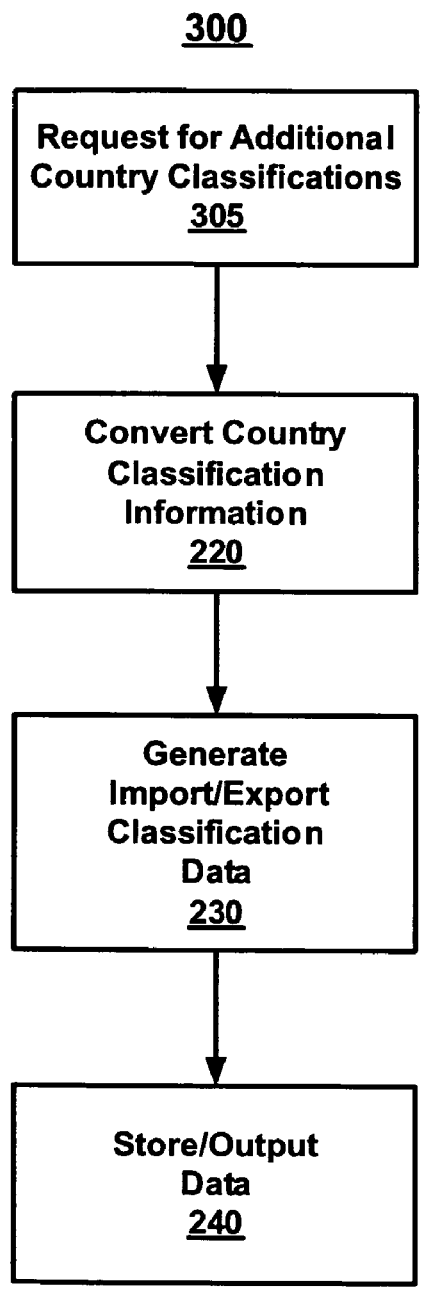
FIG. 3 is a flowchart of steps in a method for requesting a product country classification in accordance with an embodiment of the present invention.

FIG. 3 is a flowchart 300 of steps in a method for requesting a product classification in accordance with another embodiment of the present product country classifier. In other words, FIG. 3 shows the classification of a part that was not initially classified for the desired country of import and/or export. For example, if the part is requested for another country that was not initially on the classification list (e.g., part is classified in Singapore but a request is received for further classification in Germany).

In general, a request for additional country classification may be made by an importer/exporter of record, or any other involved entity. For example, if a part is shipped to a country (or prepared for export from the country) and the part is not correctly classified for that country, then no duty, tax, license, or the like has been established for the part. That is, the part does not have the correct country classification. Therefore, the customs of the country will not allow the part to be imported and the part will be impounded until the proper classification, payment, and/or paperwork is delivered.

If the request for classification is handled manually, the part may be impounded for an extended period of time as a result in delay of the manual classification (due to time zone differences, weekends, working hours, or the like). This impoundment may result in additional fines or fees, the inability to meet a manufacturing deadline, hold up production of a component, cause a manufacture delay, adversely effect production, etc. However, when the request for classification is handled automatically by the CRS 110, then the additional country classification of the part will be available real-time or nearly real-time and there will be no need for impoundment, fines, delays, manufacturing issues, or the like.

Referring now to step 305 of FIG. 3 and to FIG. 2, a request for additional country classification is received to the part classification receiver 120 of FIG. 1. The request is then passed to the country information accessor 122 of CRS 110 for further country classification of a part already classified in at least one country. In one embodiment, the previous country classification for the part is stored in the country information database. In another embodiment, the previous country classification is provided with the initial part classification request.

The previous country classification information, along with any additional information from the country information database 130 is then passed to the base translator 140 (or inter-base translator 141) for translation. For example, the base translator 140 receives the Singapore country classification and information (e.g., American base). The American base classification is then converted to the European base and specifically to the German HTS. Therefore, the converted country classification information is generated without manual intervention and at real or near real-time.

Referring now to step 230 of FIG. 3 and to FIG. 1, in one embodiment, the import and/or export needs for the specified countries are requested by the import/export information accessor 145 and retrieved from the import/export information database 150. The requirements may include any or all of trade statistics, duty and tax calculations, import/export license(s), hazardous material documents, and the like.

With reference now to step 240 of FIG. 3 and to FIG. 1, in one embodiment, the CRS 110 stores the retrieved information from the import/export database 150. In another embodiment, the information retrieved from the import/export database 150 by the import/export information accessor 145 is passed to the information outputter 155. This information (e.g., export information 160 and/or import information 170) may be delivered to the exporter of record, importer of record, shipping department, receiving department, shipping company, country of import customs, country of export customs, broker, or any other party associated with the import and/or export of parts, components, assemblies, software, Intellectual property, or the like. In one embodiment, the information is electronic. In another embodiment, the information is in hardcopy form. Additionally, the information could include payment or other accounting information.

Figure 4:
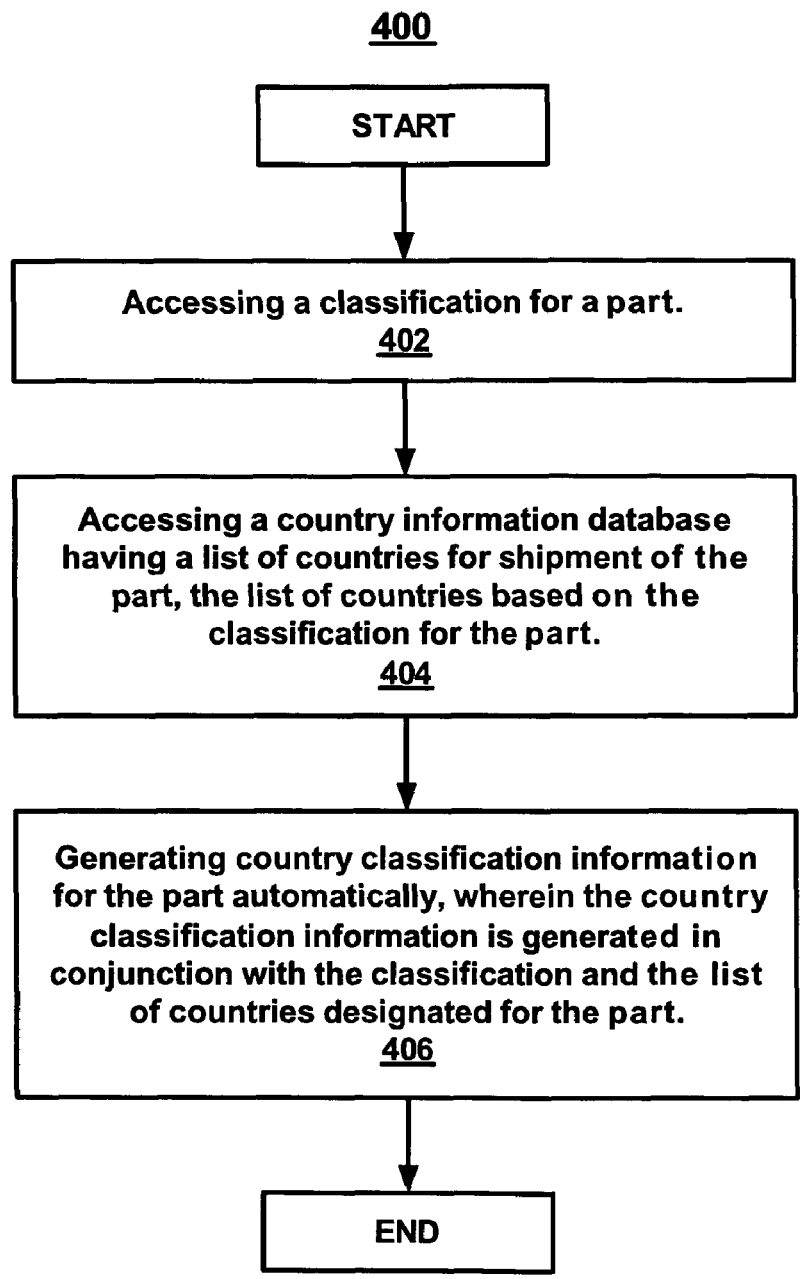
FIG. 4 is a flowchart of a method for determining, storing, and analyzing product country classifications in accordance with an embodiment of the present invention.

With reference now to FIG. 4, a flowchart 400 of a method for determining, storing, and analyzing product classifications is shown in accordance with an embodiment of the present product country classifier.

Referring now to FIG. 4 and to FIG. 1, at step 402 of flowchart 400, the present embodiment accesses a classification for a part. That is, as described in detail herein, the CRS 110 receives a part classification 118 or a request for further classification of a part in the database. In one embodiment, the requested country classification 120 for the part is an export classification. In another embodiment, the requested country classification 120 for the part is an import classification. In yet another embodiment, the requested country classification 120 for the part is both an import and an export classification.

Referring now to step 404, the present embodiment utilizes a country information accessor 122 to access a country information database 130 to retrieve information for the countries outlined for shipment of the part, wherein the list of countries is based on the classification of the part. In one embodiment, the country information accessor 122 receives a user input selecting the desired countries for the country classification. For example, the user will select the entire eastern coast of Europe as the list of countries, or the NATO countries, or the Mediterranean countries, or the like, and provide that information to the part classification receiver 120.

As described in detail herein, the CRS 110 also includes a base translator 140 and/or inter-base translator 141. In one embodiment, the base translator 140 provides automatic translation between the different bases (e.g., the American base, the European base, the Asian base, and the like). Therefore, if the part has already received a classification in an American base, instead of manually reclassifying the part in a European base and possibly making an error (e.g., classifying a fax/phone as a phone in European base for import when it was classified as a fax in American base for export), the base translator 140 will access the previous classification and automatically reclassify the fax of the American base as a fax in the European base.

In another embodiment, the inter-base translator 141 will perform inter-base translation. For example, the inter-base translator will access a previous United States of America classification of a fax and automatically reclassify the fax as a Canada classification (both within the American base).

With reference now to step 406, the present embodiment generates country classification information for the part automatically. Additionally, the country classification information is generated in conjunction with the part classification and the list of countries included with the part classification. As a result, the present embodiment provides automatic country classification for a part, component and/or assembly. In one embodiment, the country classification for the part includes any or all of the following: trade statistics, duty calculations, tax calculations, import license, export license, hazardous material classification, or the like. Although such classification parameters are provided in the present embodiment, the present product country classifier is not limited to providing such classification parameters. Additionally, the present product country classifier is well suited to providing various other classification parameters.

Thus, embodiments of the present product country classifier provide methods and systems for determining, storing, and analyzing product classifications. By automatically performing the product classifications, the present product country classifier provides real-time or near real-time product country classification of a part for countries receiving imports or providing exports thereby reducing lag time inherent with a manual system. Moreover, with the automation of the process, the problems of incorrect data input are reduced. In addition, an initial part classification may be used to provide country classifications for a plurality of countries instead of just one country at a time.

Embodiments of the present product country classifier are thus described. While the present product country classifier has been described in particular embodiments, it should be appreciated that the present product country classifier should not be construed as limited by such embodiments, but rather construed according to the following claims.

What is claimed is:

1. A method for determining, storing, and analyzing product country classifications comprising:
   accessing a classification for a part, said classification in a base associated with a first country;
   accessing a country information database having a list of countries for shipment of said part, said list of countries based on said classification for said part;
   automatically translating said classification from said base associated with said first country to at least one base associated with said list of countries, wherein said translating is performed at a base translator; and
   generating a country classification information for said part automatically, wherein said country classification information is generated in conjunction with the classification and the list of countries designated for said part.

2. The method of claim 1 wherein the country classification for the part is an export country classification.

3. The method of claim 1 wherein the country classification for the part is an import country classification.

4. The method of claim 1 wherein the classification for the part further comprises:
   accessing a user input for the list of countries for said country classification of said part.

5. The method of claim 1 wherein the classification for the part further comprises:
   automatically selecting the list of countries for said country classification of said part.

6. The method of claim 1 wherein the base translator provides translation between an American base and a European base.

7. The method of claim 1 wherein the base translator provides translation between two countries within a same base.

8. The method of claim 1 wherein the country classification information is selected from the group consisting of:
   trade statistics, duty calculations, tax calculations, import license, export license, and hazardous material documentation.

9. A business method for determining, storing, and analyzing product country classifications comprising:
   accessing a classification for a part, said classification in a base associated with a first country;
   accessing a country information database having a list of countries for shipment of said part, said list of countries based on said classification for said part;
   automatically translating said classification from said base associated with said first country to at least one base associated with said list of countries, wherein said translating is performed at a base translator; and
   generating country classification information for said part automatically, wherein said country classification information is generated in conjunction with the classification and the list of countries designated for said part.

10. The business method of claim 9 wherein accessing the classification for the part further comprises:
   accessing a user input for the list of countries for said country classification of said part.

11. The business method of claim 9 wherein said accessing of a country information database further comprises:
   providing a base translator for translating the classification language between a plurality of bases.

12. The business method of claim 11 wherein the base translator provides translation of the classification between two countries within a same base.

13. The business method of claim 9 wherein the country classification information is selected from the group consisting of:
   trade statistics, duty calculations, tax calculations, import license, export license, and hazardous material documentation.

* * * * *

UNITED STATES PATENT AND TRADEMARK OFFICE
CERTIFICATE OF CORRECTION

PATENT NO. : 8,131,603 B1
APPLICATION NO. : 10/964527
DATED : March 6, 2012
INVENTOR(S) : Hermann Schrade It is certified that error appears in the above-identified patent and that said Letters Patent is hereby corrected as shown below:

In column 10, line 33, in Claim 11, before "between" delete "language".

Signed and Sealed this
Sixth Day of November, 2012

David J. Kappos
*Director of the United States Patent and Trademark Office*